[12] United States Patent
Blodgett et al.

(10) Patent No.: US 10,104,231 B2
(45) Date of Patent: Oct. 16, 2018

(54) SIMPLICITY FRAMEWORK

(75) Inventors: Ernie Blodgett, Heber City, UT (US);
Matt Blodgett, Heber City, UT (US);
Todd Larson, Heber City, UT (US)

(73) Assignee: Conduent Business Services, LLC,
Dallas, TX (US)

( * ) Notice: Subject to any disclaimer, the term of this patent is extended or adjusted under 35 U.S.C. 154(b) by 836 days.

(21) Appl. No.: 13/560,603

(22) Filed: Jul. 27, 2012

(65) Prior Publication Data

US 2014/0029743 A1    Jan. 30, 2014

(51) Int. Cl.
*H04M 3/51* (2006.01)

(52) U.S. Cl.
CPC ...... *H04M 3/5133* (2013.01); *H04M 2201/42* (2013.01); *H04M 2203/357* (2013.01)

(58) Field of Classification Search
CPC ......... H04M 3/5133; H04M 2203/402; H04M 2201/42; G06F 3/048; G06F 8/34; G06Q 30/016
USPC ......................................... 379/265.09; 705/4
See application file for complete search history.

(56) References Cited

U.S. PATENT DOCUMENTS

| | | | | |
|---|---|---|---|---|
| 5,621,789 A * | 4/1997 | McCalmont | ............ | H04M 3/36 |
| | | | | 379/265.06 |
| 6,049,602 A * | 4/2000 | Foladare et al. | ......... | 379/265.04 |
| 8,185,463 B1 * | 5/2012 | Ball | ....................... | G06Q 40/08 |
| | | | | 705/2 |
| 8,577,018 B1 * | 11/2013 | Ben-Yair et al. | ........ | 379/266.01 |
| 2001/0024497 A1 * | 9/2001 | Campbell et al. | ........ | 379/265.09 |
| 2005/0053224 A1 * | 3/2005 | Pennington et al. | .... | 379/265.09 |
| 2005/0235206 A1 * | 10/2005 | Arend | ................... | G06F 3/0482 |
| | | | | 715/705 |
| 2006/0153064 A1 * | 7/2006 | Caballero-McCann | ..................... | |
| | | | | H04L 67/14 |
| | | | | 370/216 |
| 2007/0211881 A1 * | 9/2007 | Parker-Stephen | ....... | 379/265.01 |
| 2010/0070307 A1 * | 3/2010 | Sinvhal-Sharma | .... | G06Q 40/08 |
| | | | | 705/4 |

OTHER PUBLICATIONS

"Jacada® Interaction Manager," Brochure, Doc. #21.100.1210, 2 pages.
"Jacada," Jacada Workspace Agent Desktop—Jacada, http://www.jacada.com/products.agent-desktop, downloaded from the Internet May 9, 2012, 12 pages.

* cited by examiner

*Primary Examiner* — Ahmad F Matar
*Assistant Examiner* — Jirapon Intavong
(74) *Attorney, Agent, or Firm* — Conley Rose, P.C.

(57) ABSTRACT

A system for handling a transaction for a client service center comprising only one interface configured to communicate with a plurality of data stores to access data, interact with a user via a single screen device, and display one at a time on the single screen device a plurality of subsequent and dependent screen views to enable the user to view the data and implement a sequence of steps selected by the user to complete a transaction, wherein the interface does not display and does not notify the user of access to data on the different data stores, and wherein the screen views are displayed in a determined order based on the transaction and the steps selected by the user to reveal the data and the steps in a hierarchical manner from more general data and steps to more detailed and dependent data and steps.

27 Claims, 10 Drawing Sheets

SIMPLICITY FRAMEWORK

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Agents or workers in client service centers, such as in call centers, mailrooms, and data entry stations, are frequently required to interact with multiple computer systems that may be relatively complex to operate for completing a transaction. Examples of the transaction include researching a question (e.g., for an inquiring customer), validating or entering data, and updating records. The systems include one or more interface systems, one or more database access systems, one or more supplementary software systems, or combinations thereof. Typically, service agents, such as customer support representatives, are required to possess a minimum level of knowledge and experience about the systems to navigate the different information at hand and find or achieve what is required. Even with relatively skilled workers that receive months of training, interacting with the systems to find the needed information may take at least minutes even for basic or relatively simple queries. Various training techniques are explored to teach the agents more information in a shorter amount of time. Typically, training software or systems are used to simplify specific parts or portions of the flow process, e.g., authentication, call wrapping, or logging.

SUMMARY

In an embodiment, the disclosure includes a system for handling a transaction for a client service center comprising only one interface configured to communicate with a plurality of data stores to access data, interact with a user via a single screen device, and display one at a time on the single screen device a plurality of subsequent and dependent screen views to enable the user to view the data and implement a sequence of steps selected by the user to complete a transaction, wherein the interface does not display and does not notify the user of access to data on the different data stores, and wherein the screen views are displayed in a determined order based on the transaction and the steps selected by the user to reveal the data and the steps in a hierarchical manner from more general data and steps to more detailed and dependent data and steps.

In another embodiment, the disclosure includes an apparatus for client service center processing comprising a processor configured to enable a user to log into a client service interface for a customer relationship management (CRM) system that is coupled to a plurality of databases, management information systems (MISs), or both, display a pre-determined sequence of screen views of the client service interface consecutively one at a time as prompted by the user to allow the user to access data at the databases, MISs, or both; and implement a plurality of steps selected by the user via the consecutively displayed screen views that guide the user to complete a transaction, wherein the screen views provide a script that the user should read to a caller.

In yet another embodiment, the disclosure includes an application for CRM comprising a plurality of instructions that cause a processor to display a log-in screen view on a screen device to authorize access to a CRM system and one or more data stores and MISs coupled to the CRM system, display a start session screen view that replaces the log-in screen view on the screen device to initiate a call session transaction for a caller after authorizing access to the CRM system, display a caller type identification screen view that replaces the start session screen view on the screen device to identify the caller's type after starting the call session, display a party verification screen view that replaces the caller type identification screen view on the screen device to verify a party associated with the caller after identifying the caller's type, display an activity selection screen view that replaces the party verification screen view on the screen device to select one of a plurality of activities available for the party after verifying the party, and display an activity screen view that replaces the activity selection screen view on the screen device to implement a selected activity after selecting one of the activities.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for simplifying the implementation of a process flow (e.g., for a transaction) of a client service center. Examples of a client service center include call centers, mailrooms, data entry systems, or other customer or data service centers. The system may be a software based interactive system that provides an interface for a plurality of activities that an agent may perform as part of a transaction (e.g., during a service call). The interface may be provided using a touch screen or a display screen and a data entry device, such as a keyboard and/or a mouse. The system may guide the agent through each step of the transaction (e.g., to gather needed information and report results), which may reduce transaction and training time and improve quality of service. The interface may be configured based on a hierarchical approach that reveals the steps to guide the agent according to a selected activity or transaction. The hierarchical approach comprises revealing more general information and data, selection options, or combinations thereof at a current screen view, and subsequently revealing more detail or dependent information and data at a subsequent screen view based on the selection options made by the user (agent). The system may reduce the training time to a plurality of minutes, hours, or days instead of weeks or months, and may also reduce the time of the transaction substantially (e.g., by about 50 to 75 percent). The system's interface, which may be a software application, may also interact with other systems (e.g., databases, web services, interactive voice response (IVR)) as needed to complete the transaction in a manner transparent to the agent. As such, the system may allow the agent to access data from multiple other systems (supplementary systems) and/or databases (also referred to herein as data store systems) via a simplified single interface (e.g., a single software or program) to the agent to complete the transaction.

Figure 1:
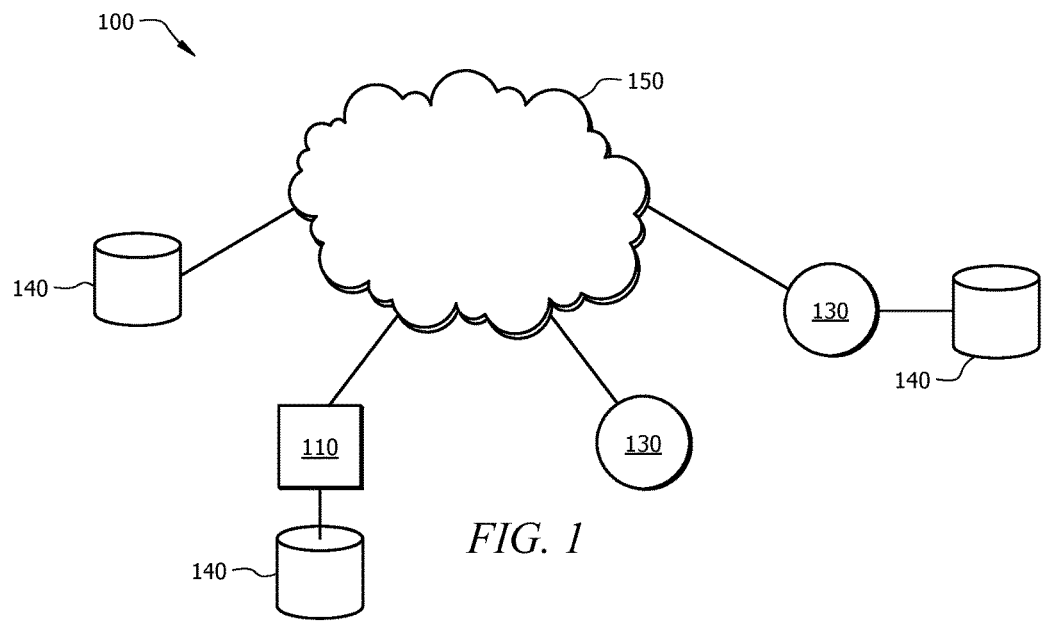
FIG. 1 is a schematic diagram of an embodiment of a client service center system.

FIG. 1 illustrates an embodiment of a call center system 100. The call center system 100 may comprise a terminal 110, a plurality of information systems 130 (e.g., MISs), one or more data stores 140, and at least one network 150. The terminal 110 may be any component, device, or apparatus configured to process, store, and exchange data with the information systems 130 and/or the data stores 140, e.g., via the network 150 and/or other means or communications. For instance, the terminal 110 may be a physical sever or a general-purpose computer, e.g., at a data center or a network. Alternatively, the terminal 110 may be a portable or personal device, such as a desktop computer, a laptop computer, a computer tablet, or a smartphone. In an embodiment, the terminal 110 may belong to a CRM system that communicates with the information systems 130.

The information systems 130 may be any systems or networks, including components and/or devices, configured to manage and store information. For instance, the information systems may be MISs for handling different applications, such as for maintaining medical data, insurance data, healthcare benefits data, accounting data, government data, social security data, statistics data, customers or subscribers data, electronic commerce data, other information or data, or combinations thereof. The information systems 130 may share data with the terminal 110 (e.g., for authorized access users) by sending the data to the terminal 110, allowing the terminal 110 to access the data locally on the information systems 130, allowing the terminal 110 to access data stores for the information systems 130 (e.g., the data stores 140), or combinations thereof.

The data stores 140 may be any devices or components configured to store data for the information systems 130 and/or the terminal 110. For instance, the data stores 140 may comprise a plurality of databases that may be accessed by authorized or corresponding information systems 130 and the terminal 110. The data stores 140 may comprise remote data stores that communicate remotely (e.g., via the network(s) 150) with the terminal 110 and the information systems 130, local data stores (e.g., hard disks) coupled locally to the terminal 110 and/or the information systems 130, or both.

The network(s) 150 may be any network(s) that communicate(s) with and allow(s) communications between the terminal 110, the information systems 130, the data stores 140, or combinations thereof. The network(s) 150 may comprise one or a plurality of access/transport networks that may be based on one or more network transport technologies and protocols. Examples of the networks 150 may include the Internet, Ethernet networks, optical backbone networks, digital subscriber line (DSL) networks, local area networks (LANs), wireless area networks (WANs), other types of telecommunication networks, or combinations thereof.

In one embodiment, the terminal 110 may be operated by an agent of a call center to answer requests and reply to inquiries of customers. The terminal 110 may be used for training and/or guiding a service agent, e.g., at a call center, to perform and complete a service call transaction. The call transaction may be a customer service call for support or inquiry, such as to receive technical support about a product, to check on a status of an order, or to complete any other customer activity or request to a call center. The customer may call or communicate with the service agent (e.g., at the call center) in real time via a phone call, a web chat, or other real-time communications between the agent and the caller, e.g., communications within the same session. The transaction may comprise a plurality of steps that may be performed by the agent that operates the interface of the system.

The terminal 110 may run a software or application interface that may be viewed, accessed, and operated by the agent using a touch screen (or a display screen), a mouse, a keyboard, other data entry devices, or combinations thereof. The software or application interface may allow the agent to pass and complete a plurality of steps or activities of the transaction via a series of screen views (e.g., one or more user interface windows on the same device screen), which may be navigated sequentially or in any order. The software or application interface may also interact in the background, e.g., in a manner transparent to the user or agent, with a plurality of other systems (e.g., MISs and/or data store systems) that may be accessed to complete the transaction. The agent may pass from one step to another by navigating between the screen views of the interface, which may integrate at least some functions of the other systems, to complete the transaction. The agent may interact with the interface in a guided manner, e.g., by navigating subsequent screen views and steps in a determined order, which may simplify the process flow. This may also allow the agent to complete the transaction in reduced time in comparison to current systems (e.g., CRM systems). In current systems, the agent may access multiple software or application interfaces for multiple systems, e.g., CRM system and MISs, using multiple system screen views or windows to complete a transaction.

Figure 2:
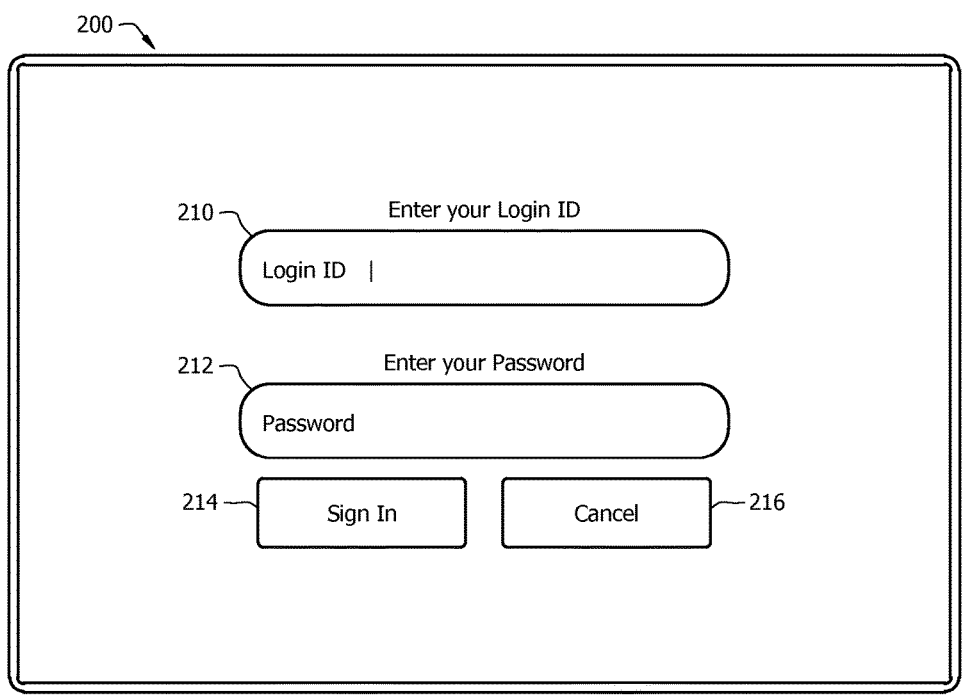
FIG. 2 is a screen shot of an embodiment of a call center system interface.

FIG. 2 illustrates an embodiment of a screen view or window 200 of a call center system interface. The call center system interface may be a CRM for healthcare management system, for instance a Medicare benefits information call center for servicing customers' inquiries. The customers may include different parties of the healthcare or Medicare coverage system, such as beneficiaries (e.g., enrolled patients, plan members) and providers (e.g., doctors, hospitals, clinics). The call center system may be operated by an insurance provider and payer or other party (e.g., a benefits management service) on behalf of the payer.

The screen view 200 may be an interactive window displayed on a screen and allow an agent of a call center to view, access, and enter data to answer customer inquiries and/or complete a transaction or request for a customer. The agent may communicate with the customer in real-time via a phone call, a web chat session, a phone chat session, a video conference or chat session, any other means of real time communications, or combinations thereof. During the real-time communications (communications within a single session), the screen view 200 may be displayed on a device operated by the agent, such as on a touch screen or a display screen coupled to or part of a personal/mobile computer device. For instance, the screen view 200 may be displayed on a touch screen of a tablet computer or a smartphone, or on a display screen of a laptop computer or a desktop computer. In the case of a touch screen based device, the agent may use the touch screen to enter data on the screen view 200, e.g., by touching or tapping on the screen. In the case of other display screens that do not support the touch functionality, the agent may use other means to enter the data on the screen view, such as a keyboard, a mouse, a touch pad, other input peripherals, or combinations thereof. In some scenarios, the device may comprise a speaker system that supports voice entry, such as in the case of some smartphones.

The screen view 200 may be part of a call center system interface (e.g., for a CRM system), which may be an application or software that operates on the personal/mobile computer device. The application may comprise a plurality of screen views (on the same device screen) that may be navigated by the agent, e.g., sequentially or in any order, to complete the transaction with the customer. The application may also operate on a kernel (software or firmware), such as an operating system (OS) that enables the device to support or run programs and applications. For example, the call center system interface may be a program that runs on a Microsoft Windows™ based OS (e.g., Windows 7™, Windows XP™, or Windows Mobile™), an Apple™ based OS (e.g., Macintosh (Mac) OS™, iPhone OS™ (iOS)), an Android™ based OS, or other operating systems.

The screen view 200 may be a first displayed screen view in a series of displayed screen views of the interface that guide the agent through a plurality of steps to complete a transaction. Specifically, the screen view 200 may allow the agent to enter his login information for authorization to grant the agent access to the call center system interface and any needed data on other supplementary systems (MISs/data store systems). The use of a single system interface via a series or sequence of screen views to access data on multiple systems may facilitate system use and reduce process time. The screen view 200 may comprise a log-in identifier (ID) input field 210, a password input field 212, a sign-in button 214, and a cancel button 216, which may be arranged as shown in FIG. 2. The screen view 200 may also comprise a plurality of text labels for identifying the components, as shown in FIG. 2.

The log-in ID input field 210 may allow the agent to type a login user ID, e.g., using the touch screen or a keyboard.

The login user ID may be a parameter used in the authorization process to identify the agent, where each agent may be assigned a unique corresponding login user ID. The password input field 212 may be configured to allow the agent to type a password. The password may be used with the login user ID in the authorization process, where the password and login user ID pair may be matched with a database for authorizing users (agents). If no match is found, then access to the system or interface may be denied. The sign-in button 214 may be configured to submit the entered login user ID and password information for authorization. The agent may touch, press, or click on the sign-in button 214 to submit this information. If the agent activates the sign-in button after entering wrong or unauthorized log-in user ID and password information or without making entries in both field, then a message may be displayed (e.g., in a box on top of the screen view or window 200) to inform the agent of unrecognized or missing information. The cancel button 216 may be configured to cancel the log-in/authorization process or to close the screen view 200. The agent may touch, press, or click on the cancel button 216 to cancel the process or close the screen view 200.

Figure 3:
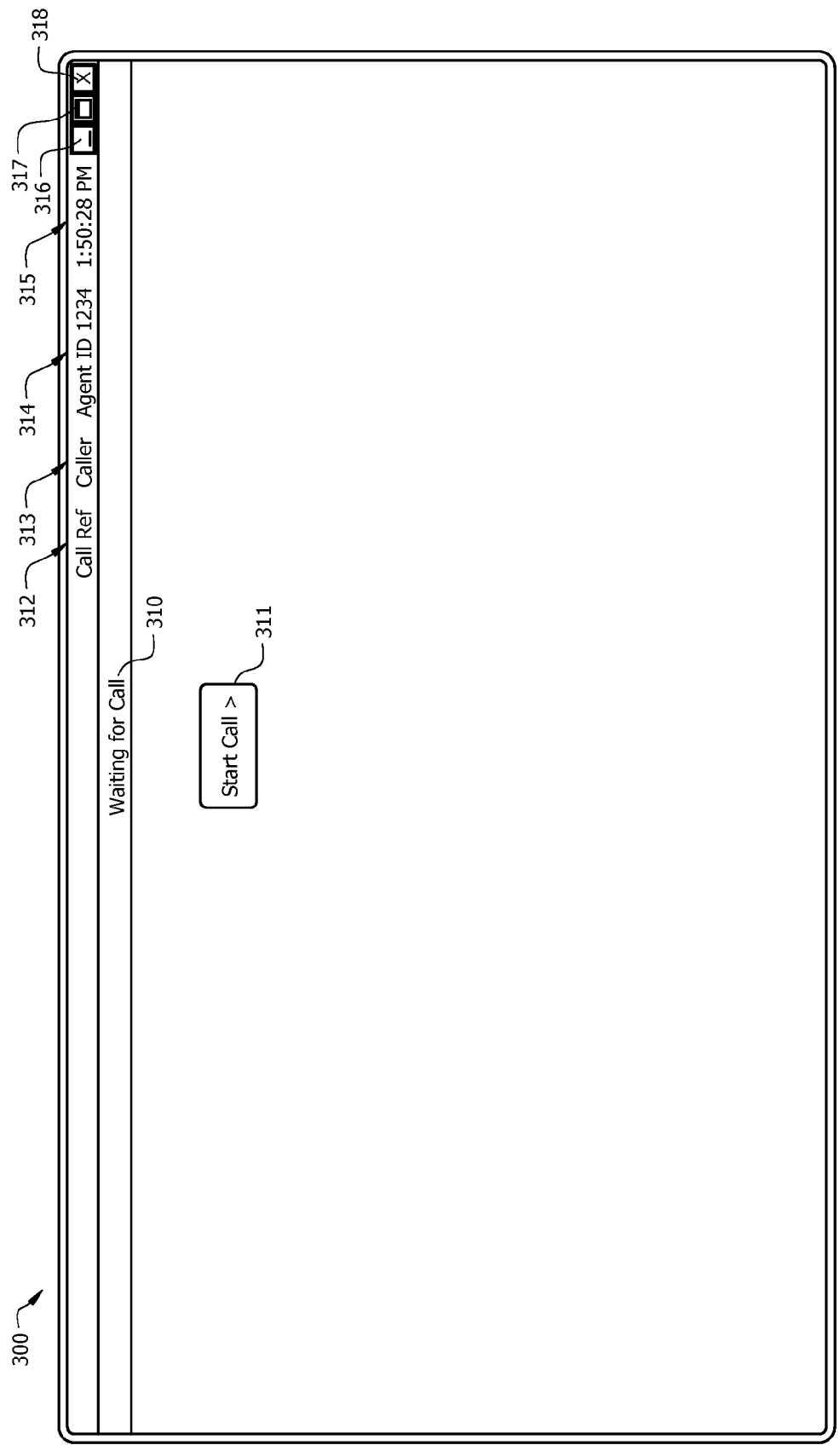
FIG. 3 is a screen shot of another embodiment of a call center system interface.

FIG. 3 illustrates an embodiment of another screen view or window 300 of the call center system interface. The screen view 300 may be another interactive window displayed on the screen and allow the agent to view, access, and enter data to implement one or more steps of the transaction for the customer (during the real-time communications). The screen view 300 may be a second displayed screen view in the series of displayed screen views of the interface. The screen view 300 may be displayed on the device screen after the agent is granted access to the system (after submitting authorized login user ID and password information). Specifically, the screen view 300 may allow the agent to start a call session with the customer, where a series of steps or activities may then be performed to complete the transaction for the customer.

The screen view 300 may comprise a status bar 310, a start call button 311, a call reference indicator 312, a caller indicator 313, an agent ID indicator 314, a time indicator 315, a minimize window button 316, a maximize window button 317, and a close window button 318, which may be arranged as shown in FIG. 3. The screen view 300 may also comprise a plurality of text labels and graphics for identifying the different components of the screen view 300 to the agent, as shown in FIG. 3. The start call button 311 may be configured to start a call session to implement a plurality of steps and activities to complete the transaction. For example, the session may be for general information inquiries, eligibility inquiries, new or replacement insurance card requests, or claims inquiries. The agent may touch, press, or click on the start call button 311 to start the session after receiving a phone call from a customer inquiring about such information. The status bar 310 may identify the screen view 300, e.g., the current step in the process flow or transaction. For example, the status bar 310 may display a text that indicates the current status as "Waiting for Call". This may help the agent identify which screen view or window is currently displayed, and hence which step or activity to perform.

The call reference indicator 312 may be configured to indicate a call ID that uniquely identifies a call session, e.g., by displaying the call ID next to a "Call Reference" (or "Call Ref") label. The call ID may not be displayed or created before the agent activates the start call button 311 and a call session is started. FIG. 3 shows the screen view 300 before the agent starts the call, and thus the call ID is not displayed yet next to the "Call Ref" label. The caller indicator 313 may be configured to indicate the caller (the customer), e.g., by displaying the caller's provided name, ID, number, or any type of identification in the form of a string of characters. The caller's name or provided identification may be displayed next to a "Caller" label. The caller's name or identification may not be displayed or created before the agent enters the caller's name or identification. FIG. 3 shows the screen view 300 before the agent enters the caller's name, and thus the caller's name is not displayed yet next to the "Caller" label.

The agent ID indicator 314 may be configured to indicate the agent ID that uniquely identifies the agent, e.g., by displaying the agent ID next to an "Agent ID" label. The agent ID may be displayed after the agent successfully logs into the system. Since FIG. 3 shows the screen view 300 after the agent submits authorized login user ID and password information (using the screen view 200), the agent ID (1234) is displayed next to the "Agent ID" label. The time indicator 315 may be configured to display the current time, such as in hours, minutes, seconds, and the 12 hours format (AM/PM), as shown in FIG. 3. In some scenarios, the time indicator 315 may also indicate the day and/or the date.

The minimize window button 316 may be configured to collapse the window or screen view 300, e.g., into an icon or a graphic that may be placed on the bottom or side of the screen. The collapsed window may remain active and the information associated with the window may be stored in the device's memory temporarily until the window is reopened or finally closed. The agent may touch, press, or click on the minimize window button 316 to collapse the window, which may remove the screen view 300 from occupying the screen and allow the agent to view other windows or material on the screen. The agent may reopen and expand the screen view 300 to occupy the screen again by touching or clicking on the icon or graphic for the collapsed window, and hence resume the use of the screen view 300. The information displayed on the screen view 300 before collapsing the screen and after expanding the screen may be substantially the same (e.g., except for the time indicator 315).

The maximize window button 317 may be configured to maximize or expand the window or screen view 300 to fully occupy the device screen, which may block all other content except the screen view 300 from view. Maximizing the screen view 300 as such may allow the agent to view more content of the screen view 300 without scrolling (up and down or sideways) through the window. When the window is maximized, the maximize window button 317 may display a different graphic to indicate that the window is maximized. When the screen view 300 is maximized, the agent may click on the maximize window button 317 to resize the window into the window's previous size before the window was maximized. The close window button 318 may be configured to close the screen view 300, which may also close the interface or application. After closing the window, the agent may need to restart the system interface or application, e.g., at the screen view 200.

Figure 4:
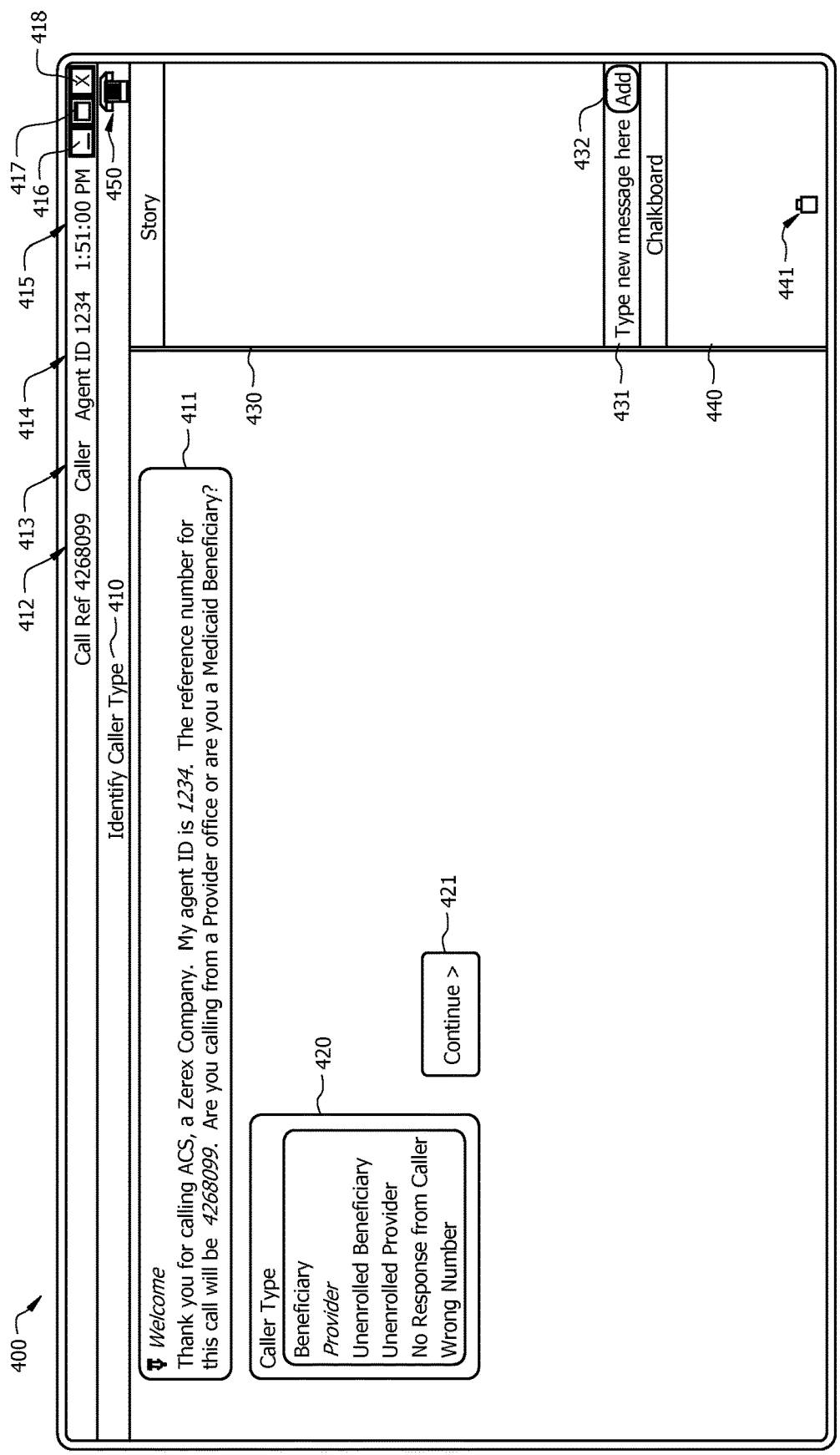
FIG. 4 is a screen shot of another embodiment of a call center system interface.

FIG. 4 illustrates an embodiment of another screen view or window 400 of the call center system interface. The screen view 400 may be another interactive window displayed on the screen and allow the agent to view, access, and enter data to implement one or more steps of the transaction for the customer. The screen view 400 may be a third displayed screen view in the series of displayed screen views of the interface. The screen view 400 may be displayed on the device screen after the agent starts a call session for the customer (after activating the start call button 311). Specifically, the screen view 400 may allow the agent to identify the type of the caller, such as a healthcare provider or beneficiary, before proceeding with further steps to service the caller. Identifying the type of caller may determine the subsequent steps, activities, and/or screen views of the interface that may be suitable for servicing the type of caller.

The screen view 400 may comprise a status bar 410, a script window 411, a caller type menu 420, a continue button 421, a story window 430, a message input field 431, an add button 432, a chalkboard window 440, a trash bin icon 441, and a call options icon 450, which may be arranged as shown in FIG. 4. Additionally, the screen view 400 may comprise a call reference indicator 412, a caller indicator 413, an agent ID indicator 414, a time indicator 415, a minimize window button 416, a maximize window button 417, and a close window button 418, which may be configured substantially similar to the corresponding components of the screen view 300. Since FIG. 4 shows the screen view 400 after the agent starts a call session (using the start call button 311), a call ID (4268099) is generated and displayed next to the "Call Ref" label of the call reference indicator 412. The screen view 400 may also comprise a plurality of text labels and graphics for identifying the different components of the screen view 400 to the agent, as shown in FIG. 4.

The status bar 410 may identify the screen view 400, e.g., the current step in the process flow or transaction. For example, the status bar 410 may display a text that indicates the current status as "Identify Caller Type". The script window 411 may show a suggested script for establishing a conversation with the caller. The script may be to welcome the caller, report the agent ID and call number to the caller, and inquire about the type of caller. The agent may choose to read the script or use his own words in line with the script.

The caller type menu 420 may be configured to show a list of available or supported types of callers (customers) and allow the agent to select one of the types of callers, e.g., by touching or clicking on the corresponding entry in the list. The list may also include other possible answers from the caller, such as a wrong number response or no response. For example, the list may include the following possible answers: Beneficiary, Provider, Un-enrolled Beneficiary, Un-enrolled Provider, No Response from Caller, and Wrong Number. The continue button 421 may be configured to submit the selection in the caller type menu 420. The agent may touch, press, or click on the continue button 421 to submit the selection. In one embodiment, if the agent activates the continue button 421 without making a selection in the caller type menu 420, then a message may be displayed (e.g., in a box on top of the screen view or window 400) to inform the agent of missing information. In another embodiment, the continue button 421 may be displayed in the screen view 400 after the agent makes a selection in the caller type menu 420.

After properly entering the information in the screen view 400 and activating the continue button 421 to submit the information and move forward in the process flow (to a next screen view), the information may be temporarily stored in memory (e.g., in a file) for the current transaction (call session). Similarly, properly entered and submitted information in next screen views may also be stored for the current transaction. The information stored for each screen view may be associated with that screen view (e.g., in a corresponding file). The stored information may be deleted upon termination of the transaction or may be moved to more persistent storage for call logging/documentation purposes.

The story window 430 may be configured to display automatically activities performed on the screen view 400 and/or information typed by the agent as part of the call logging process. For example, the story window 400 may display the selection made by the agent in the caller type menu 420. The message input field 431 may allow the agent to type a message or text, e.g., a string of characters, as part of the call logging process. The add button 432 may be configured to submit the data typed in the message input field 431 to be displayed in the story window 430. The information displayed in the story window 430 may also be saved in a file (e.g., a log file) of the system.

The chalkboard window 440 may be configured to display automatically ID and key information, which may be displayed or entered in the screen view 400, such as the call ID, the agent ID, other IDs, serial numbers, keys, indices, and similar information. The trash bin icon 441 may be activated to remove information from display in the chalkboard window 440. The agent may remove any selected data (e.g., ID or number) in the chalkboard window 440 by dragging the data to the trash bin 441. The data may be dragged using a finger on a touch screen device or using a mouse on a non-touch screen device. The call options icon 450 may be activated to show a list of available call options, which may include putting a call on hold, ending or dropping a call, rejecting a call, transferring a call, and/or other call options. The list may be a drop list of options that may be displayed by tapping or clicking on the call options icon 450, e.g., a graphic of a phone as shown in FIG. 4.

Figure 5:
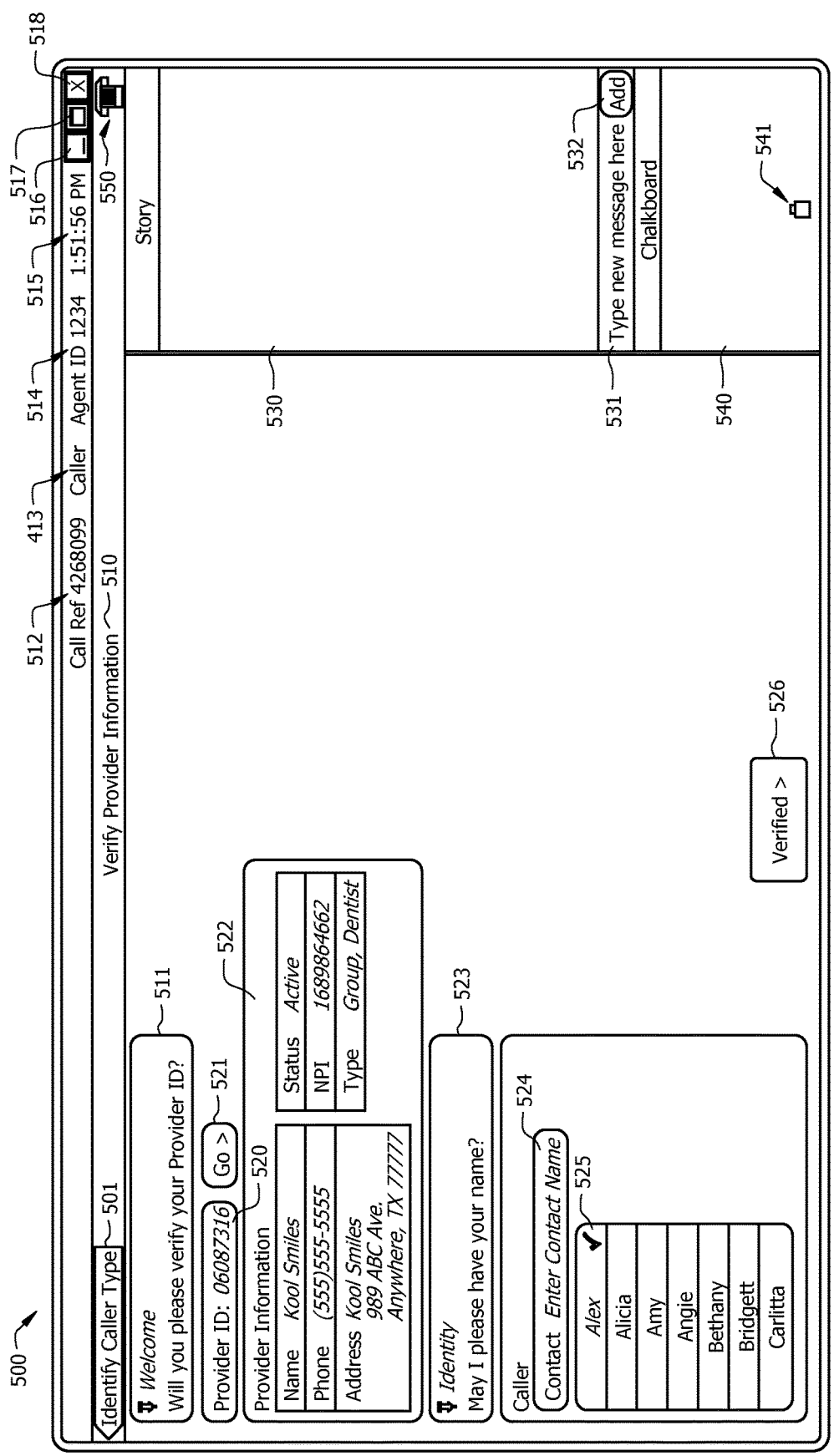
FIG. 5 is a screen shot of another embodiment of a call center system interface.

FIG. 5 illustrates an embodiment of another screen view or window 500 of the call center system interface. The screen view 500 may be another interactive window displayed on the screen and allow the agent to view, access, and enter data to implement one or more steps of the transaction for the customer. The screen view 500 may be a fourth displayed screen view in the series of displayed screen views of the interface. The screen view 500 may be displayed on the device screen after the agent selects and submits the caller type (after activating the continue button 421). Specifically, the screen view 500 may allow the agent to verify caller information with the caller, e.g., to identify the individual calling and/or authenticate the caller identity before proceeding further. Identifying the caller and authenticating the caller's identity may avoid disclosing privileged party information to non-authorized callers.

The screen view 500 may comprise a navigate-back button 501, a status bar 510, a script window 511, a caller ID input field 520, a go button 521, a call information list or table 522, a second script window 523, a caller/contact input field 524, a caller/contact menu 525, and a verified button 526, which may be arranged as shown in FIG. 5. Additionally, the screen view 500 may comprise a call reference indicator 512, a caller indicator 513, an agent ID indicator 514, a time indicator 515, a minimize window button 516, a maximize window button 517, a close window button 518, a story window 530, a message input field 531, an add button 532, a chalkboard window 540, a trash bin icon 541, and a call options icon 550, which may be configured substantially similar to the corresponding components of the screen views 300 and 400. The screen view 500 may also comprise a plurality of text labels and graphics for identifying the different components of the screen view 500 to the agent, as shown in FIG. 5.

The navigate-back button 501 may be configured to return to the last previous screen view processed before the current screen view 500, e.g., the screen view 400. The agent may touch, press, or click on the navigate-back button 501 to revisit the steps of the previous screen view, e.g., reselect the caller type in the screen view 400, such as in the case of an error or change of information. The navigate-back button 501 may be a mechanism that allows the agent to switch back between screen views or windows, e.g., in the reverse order the screen views were navigated. Using the navigate-back button 501, the agent may be able to return to the previous screen views or windows in the reverse order of their appearance. At each screen view, the navigate-back button 501 may be labeled to indicate the activity or step in the previous screen view. For instance, the navigate-back button 501 in the screen view 500 may be labeled as "Identify Caller Type" similar to the status bar 410 in the screen view 400. After navigating backwards through one or more screen views using the navigate-back button 501, the agent may start again moving forward by reactivating the appropriate buttons and resubmitting the appropriate information in the corresponding screen views. In some embodiments, after navigating backwards through one or more screen views using the navigate-back button 501, the agent may use a return button (not shown) to return directly to the last screen view in the sequence of operated screen views, and hence continue the transaction where the agent last stopped. When the agent returns to a previously processed screen view, the previously entered information in that screen view or window, which may be temporarily stored as described above, may be automatically displayed when the screen view is displayed. When the agent enters new information or changes previously entered information, submits the new or changed information, and moves forward to the next screen views, the new information may be stored and replace the previously entered information for each screen view.

The status bar 510 may identify the screen view 500, e.g., the current step of the process flow or transaction. For example, the status bar 510 may display a text that indicates the current status as "Verify Provider Information". The script window 511 may show a suggested script for establishing conversation with the caller. The script may be to verify the caller identity by requesting a provider ID (since the selected caller type in the previous screen view (screen view 400) was a provider). The agent may read the script or may request the information indicated by the script in his own words.

The caller ID input field 520 may allow the agent to type a caller ID, e.g., using the touch screen or a keyboard. The caller ID may be a provider ID, since the selected caller type in the previous screen view (screen view 400) was a provider. The go button 521 may be configured to submit the information (the provider ID) entered in caller ID input field 520. The call information list or table 522 may be configured to display information about the caller (provider) that matches the entered caller ID (provider ID). For example, provider information may comprise name, phone, address, status, type, and national provider index (NPI) information. The NPI is used in the medical industry as a unique ID for a doctor, hospital, or other healthcare provider. The information may be displayed as shown in FIG. 5 or in other suitable display formats. In an embodiment, if the agent activates the go button 521 without entering the caller or provider ID, then a message may be displayed (e.g., in a box on top of the screen view or window 500) to inform the agent of missing information. A message may also be displayed if the agent enters an incorrect or unrecognized ID.

The second script window 523 may show a suggested script for requesting the caller's name. The caller/contact input field 524 may allow the agent to type a caller name, which may be provided by the caller. The caller/contact menu 525 may be configured to show a list of recognized contact names associated with the caller (provider). The agent may select one of the contact names, e.g., by touching or clicking on the corresponding entry in the list. A "check" mark may be displayed automatically next to the selected contact name in the menu. The agent may have the choice to select the contact name (the caller name) from the caller/contact menu 525 or type in the name into the caller/contact input field 524 (e.g., instead of searching the menu). If the entered caller name is in the menu, then the name may be automatically selected from the menu. Otherwise, the entered name may not be verified as an authorized contact associated with the caller or provider ID. The caller/contact input field 524 may also be configured to suggest, correct, and/or complete typing the name automatically, which may help in finding a match in the menu. In an embodiment, the call information list or table 522, second script window 523, caller/contact input field 524, and caller/contact menu 525 may be displayed in the screen view 500 after the agent enters a valid caller or provider ID and submit this information using the go button 521.

The verified button 526 may be configured to submit the entered or selected contact name (in the caller/contact menu 525). The agent may touch, press, or click on the verified button 526 to submit this information. If the agent activates the verified button 526 without entering or selecting a recognized contact name, then a message may be displayed to inform the agent of missing or unverified information. In an embodiment, the verified button 526 may be displayed in the screen view 500 after the agent enters or selects a contact caller/contact name.

Figure 6:
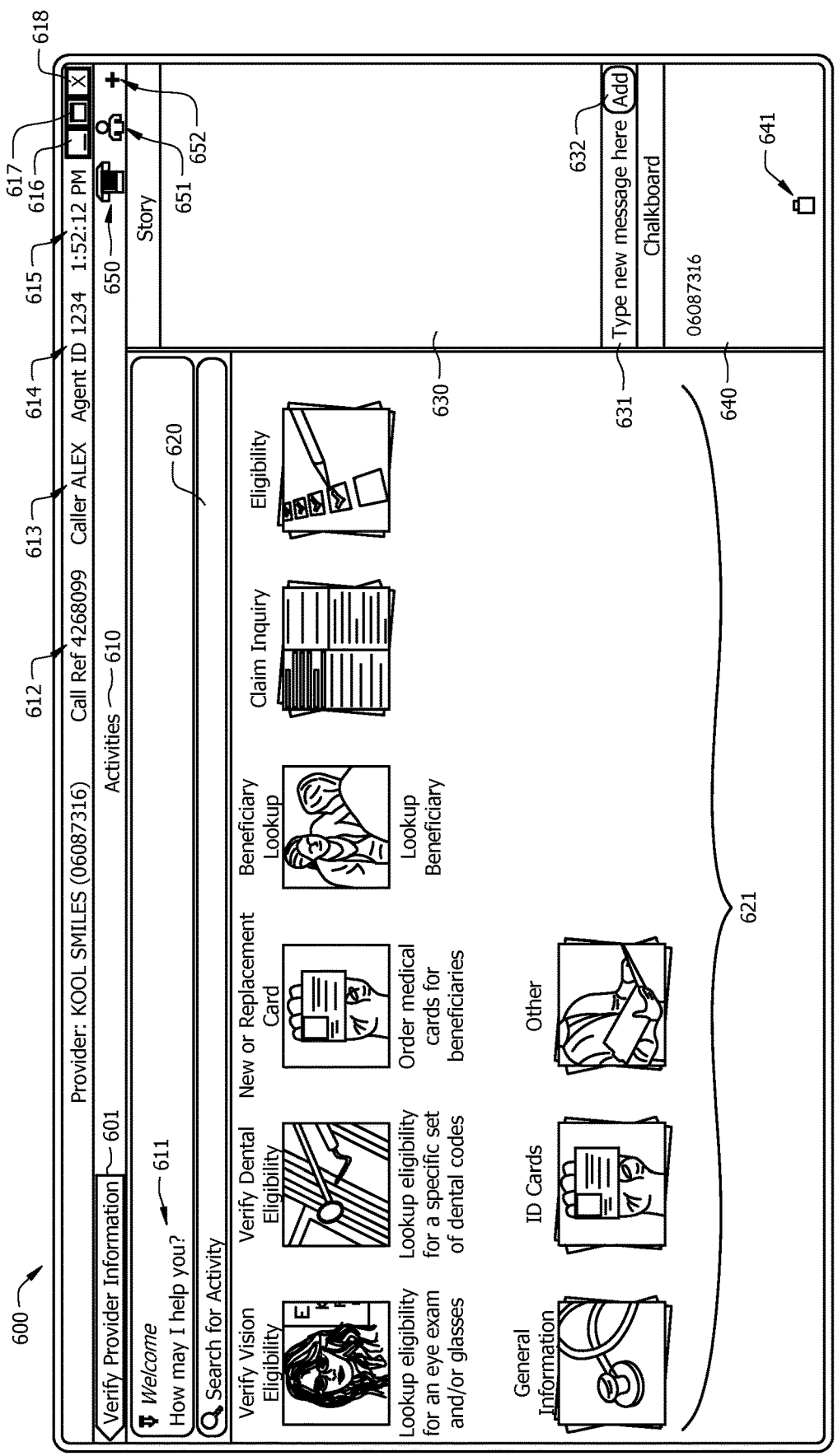
FIG. 6 is a screen shot of another embodiment of a call center system interface.

FIG. 6 illustrates an embodiment of another screen view or window 600 of the call center system interface. The screen view 600 may be another interactive window displayed on the screen and allow the agent to view, access, and enter data to implement one or more steps of the transaction for the customer. The screen view 600 may be a fifth displayed screen view in the series of displayed screen views of the interface. The screen view 600 may be displayed on the device screen after verifying the caller name in the screen view 500 (after activating the verified button 526). Specifically, the screen view 600 may allow the agent to select one or multiple available and supported activities for the verified caller.

The screen view 600 may comprise a navigate-back button 601, a status bar 610, a script window 611, a search input field 620, and a plurality of activity graphics or icons 621 (that may serve as buttons), which may be arranged as shown in FIG. 6. Additionally, the screen view 600 may comprise a call reference indicator 612, a caller indicator 613, an agent ID indicator 614, a time indicator 615, a minimize window button 616, a maximize window button 617, a close window button 618, a story window 630, a message input field 631, an add button 632, a chalkboard window 640, a trash bin icon 641, and a call options icon 650, which may be configured substantially similar to the corresponding components of the screen views above.

Since FIG. 6 shows the screen view 600 after the agent submits a verified contact name (using the verified button 526), the contact name (ALEX) is displayed next to the "Caller" label of the caller indicator 613. A provider ID (06087316) may also be automatically displayed in the chalkboard window 640 after being previously entered in the screen view 500 (using the caller ID input field 520). Additionally, the screen view 600 may comprise a caller information icon 651 and a new activity icon 652, e.g., next to the call options icon 650. The screen view 600 may also comprise a plurality of text labels and graphics for identifying the different components of the screen view 600 to the agent, as shown in FIG. 6.

The navigate-back button 601 may be configured to return to the last previous screen view, e.g., the screen view 500. The agent may touch, press, or click on the navigate-back button 601 to revisit the steps of the previous screen view, e.g., reselect and verify the caller name using the screen view 500, such as in the case of an error or change of information. The status bar 610 may identify the screen view 600, e.g., the current step in the process flow or transaction. For example, the status bar 610 may display a text that indicates the current status as "Activities". The script window 611 may show a suggested script to ask the caller about his request, and hence determine which activity to handle for the caller.

The search input field 620 may allow the agent to enter the activity name to handle according to the caller's request. The activity graphics or icons 621 may be pictures or icons that represent a plurality of corresponding available activities supported by the system. The displayed activities may be specific to the caller type (e.g., a provider) or for all supported types of callers in the system. For instance, the activities may be related to verifying vision eligibility (for a patient of the provider or a beneficiary), verifying dental eligibility, requesting a new or replacement card, beneficiary lookup, claims inquiry, eligibility, general information, ID cards, and/or other. The pictures may be accompanied by the corresponding activity names. The agent may select one of the activities as requested by the caller by tapping or clicking on one of the pictures. The agent may have the choice to select the activity from the activity graphics or icons 621 or type in the activity name into the search input field 620. If the entered activity name is one of the supported activities, then the activity may be automatically selected from the menu. Otherwise, the entered activity name may not be recognized and a message may be displayed to indicate as such. The search input field 620 may also be configured to suggest, correct, and/or complete typing the activity name automatically, which may help in finding an available match. In some scenarios, the number of activities, and thus pictures, may be larger than the available space for display in the screen view 600. In this case, the agent may prefer to use the search input field 620 to locate the activity, e.g., instead of scrolling down the screen view 600 to locate the activity.

The caller information icon 651 may be activated to show available information about the caller (e.g., based on the submitted caller name). The information may be displayed as a list of data, which may include the caller name, contact number, address, history of calls, and/or other relevant information about the caller. The list may be a drop list of data that may be displayed by tapping or clicking on the caller information icon 651. The new activity icon 652 may be activated (via a touch or click) to start a new activity for the caller. When the new activity icon 652 is activated, a new additional screen view 600 may be displayed to select a new activity and the current screen view may be collapsed, e.g., into an icon or a graphic that may be placed on the bottom or side of the screen. As such, the agent may open a plurality of screen views to process multiple activities during a call session, where separate series of screen views may be visited (e.g., in parallel) to process different activities.

Figure 7:
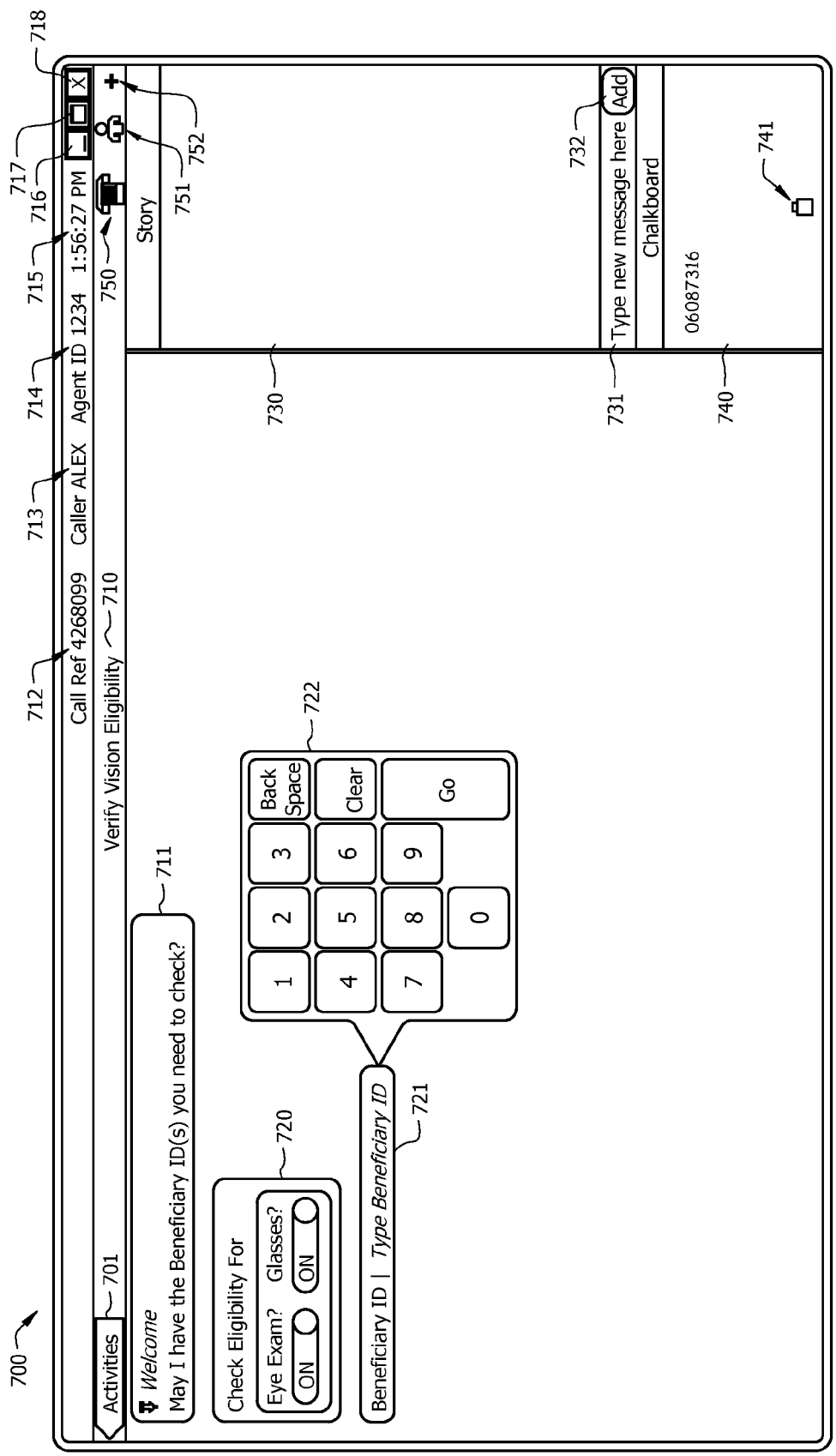
FIG. 7 is a screen shot of another embodiment of a call center system interface.

FIG. 7 illustrates an embodiment of another screen view or window 700 of the call center system interface. The screen view 700 may be another interactive window displayed on the screen and allow the agent to view, access, and enter data to implement one or more steps of the transaction for the customer. The screen view 700 may be a sixth displayed screen view in the series of displayed screen views of the interface. The screen view 700 may be displayed on the device screen after selecting one of the activities to perform for the caller in the screen view 600 (after activating one of the activity graphics or icons 621). Specifically, the screen view 700 may be displayed after selecting the activity for verifying vision eligibility and may allow the agent to select one or more eligibility options.

The screen view 700 may comprise a navigate-back button 701, a status bar 710, a script window 711, a check eligibility option list 720, a beneficiary ID input field 721, and a number dialer 722, which may be arranged as shown in FIG. 7. Additionally, the screen view 700 may comprise a call reference indicator 712, a caller indicator 713, an agent ID indicator 714, a time indicator 715, a minimize window button 716, a maximize window button 717, a close window button 718, a story window 730, a message input field 731, an add button 732, a chalkboard window 740 that may display a previously entered provider ID (06087316), a trash bin icon 741, a call options icon 750, a caller information icon 751, and a new activity icon 752, which may be configured substantially similar to the corresponding components of the screen views above. The screen view 700 may also comprise a plurality of text labels and graphics for identifying the different components of the screen view 700 to the agent, as shown in FIG. 7.

The navigate-back button 701 may be configured to return to the last previous screen view, e.g., the screen view 600. The agent may touch, press, or click on the navigate-back button 701 to revisit the steps of the previous screen view, e.g., reselect an activity, such as in the case of an error or change of information. The status bar 710 may identify the screen view 700, e.g., display the current status as "Verify Vision Eligibility" activity. The script window 711 may show a suggested script to ask the caller for the beneficiary ID. The check eligibility option list 720 may comprise one or more options for eligibility verification, such as for eye exam and glasses. The check eligibility option list may comprise a switch for each eligibility option, which may be set to "ON" to indicate eligibility or "OFF" to negate eligibility. The switch may be switched by sliding the switch sideways into one of two opposite positions (left or right) using a finger or a mouse. The switch may display "ON" or "OFF" according to the position the switch is set to. The beneficiary ID input field 721 may allow the agent to type a beneficiary ID, which may be provided by the caller. Alternatively, the agent may use the number dialer 722 to dial the beneficiary ID, e.g., by touching or clicking on the number buttons of the number dialer 722. The number dialer 722 may be displayed when the agent activates the beneficiary ID input field 721, e.g., when the agent touches or clicks on the beneficiary ID input field 721, and may be hidden (removed from view) when the beneficiary ID input field 721 is inactive, e.g., when the agent touches or clicks outside the beneficiary ID input field 721.

Figure 8:
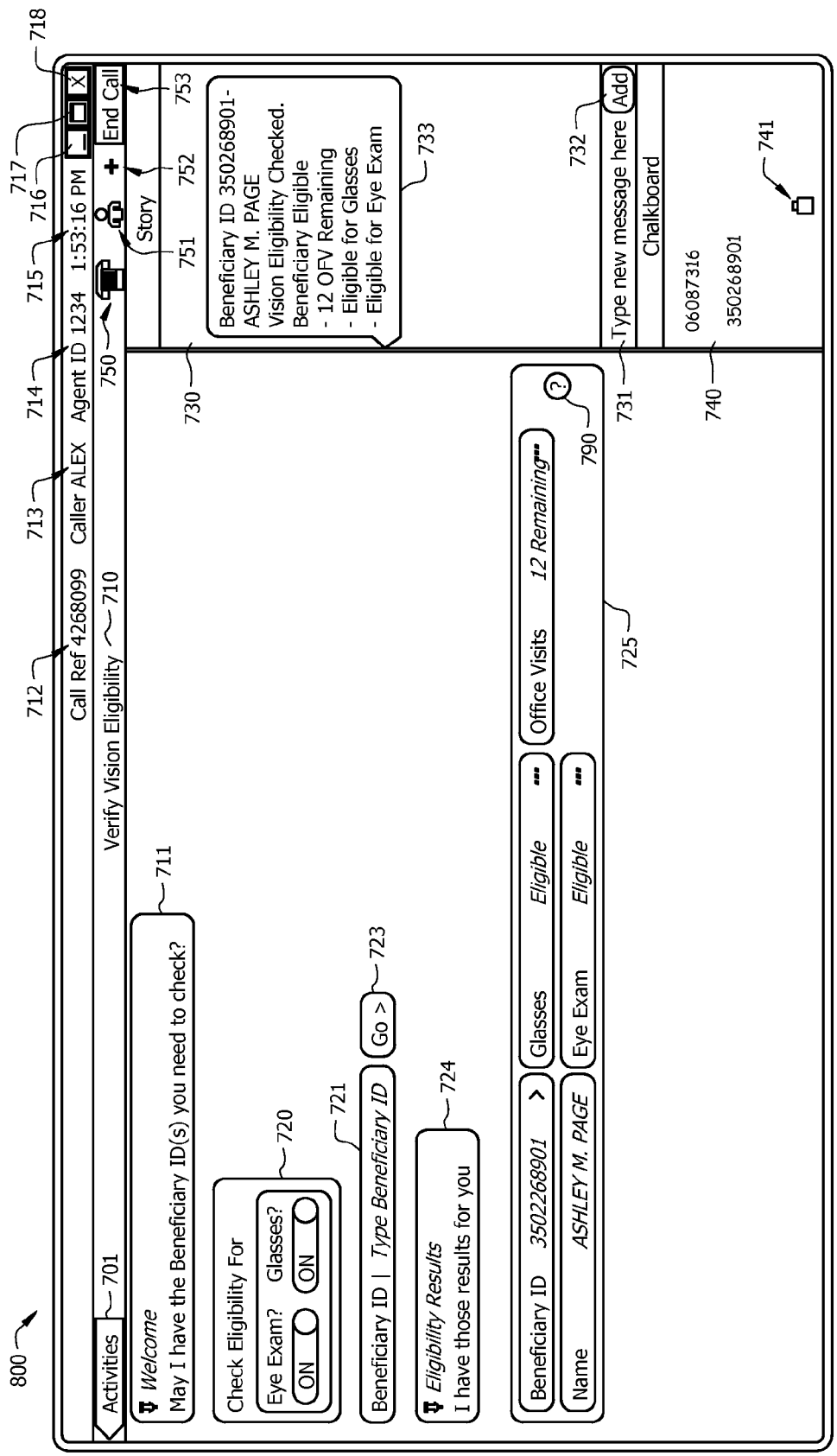
FIG. 8 is a screen shot of another embodiment of a call center system interface.

FIG. 8 illustrates another embodiment of the screen view or window 700, which may be shown on the device screen after submitting the beneficiary ID in the beneficiary ID input field 721. After entering the beneficiary ID in the beneficiary ID input field 721, the screen view 700 may include (in addition to the components above) a go button 723, a second script window 724, and a beneficiary information list or table 725. The go button 723 may be configured to submit the information (the beneficiary ID) entered in the beneficiary ID input field 721. The second script window 724 may show a suggested script to report the eligibility information results to the caller. The beneficiary information list or table 725 may be configured to display information about the member with the entered beneficiary ID. For example, the information may comprise the beneficiary ID, name, eligibility status for the selected options in the check eligibility option list 720 (eye exam and glasses), and number of office visits. The information may be displayed as shown in FIG. 8 or in other suitable display formats. The beneficiary information list or table 725 may also comprise an information button 790, which may be activated (via touching or clicking) to display additional information, such as more beneficiary information and/or more detailed information. The submitted beneficiary ID (350268901) may also be automatically displayed in the chalkboard window 740 after being entered in the beneficiary list or table 725 by the user. Additionally, the screen view or window 700 may comprise an end call button 753, which may be activated to end the call session with the caller.

Figure 9:
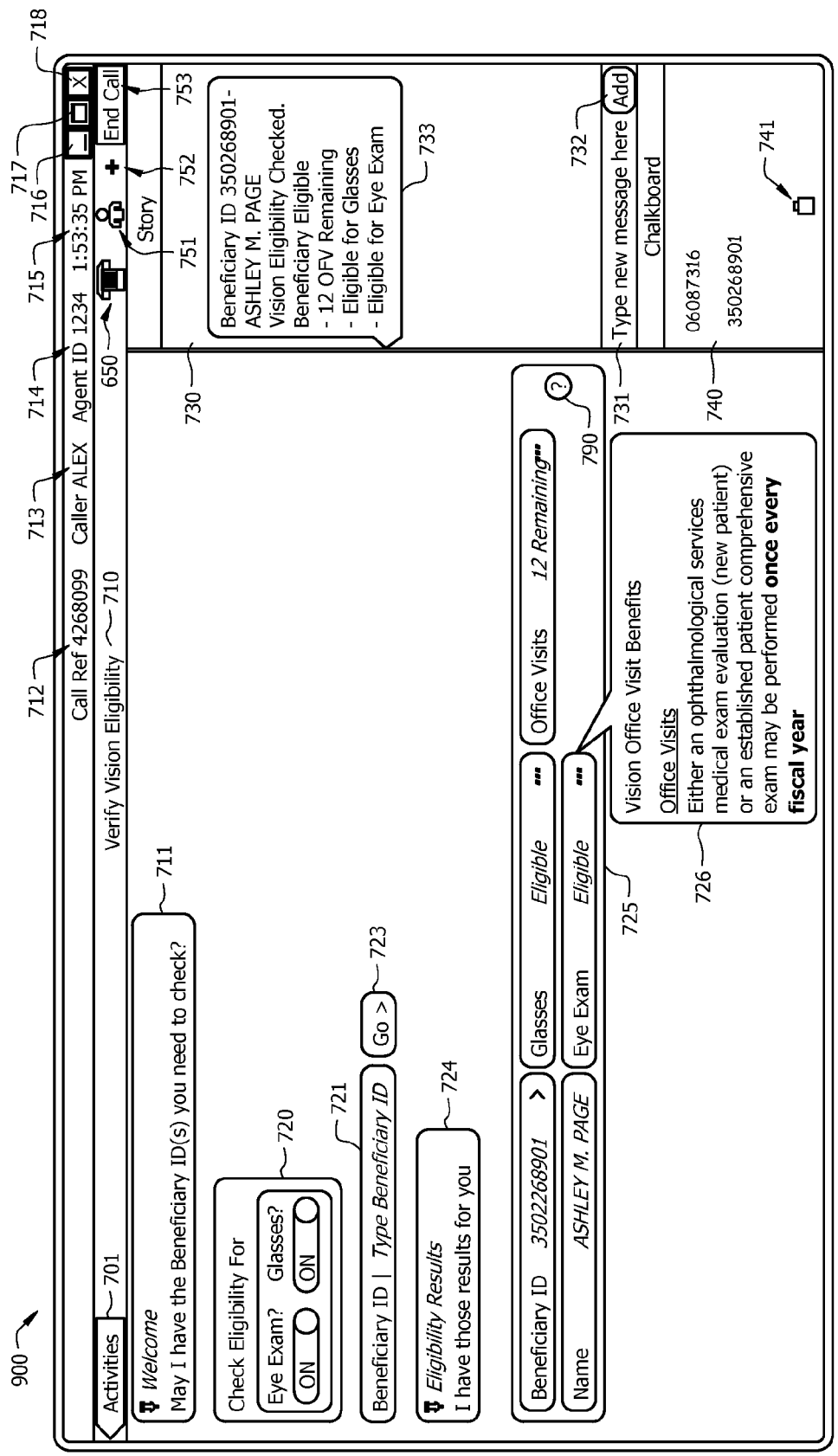
FIG. 9 is a screen shot of another embodiment of a call center system interface.

FIG. 9 illustrates another embodiment of the screen view or window 700, which may be shown on the device screen after displaying the beneficiary information list or table 725. After displaying the beneficiary information list or table 725, the screen view 700 may include (in addition to the components above) a detailed benefits information window 726. By tapping or clicking on a designated point for one of the entries in the beneficiary information list or table 725, such as the ellipses in FIG. 9, the detailed benefits information window 726 may display more detailed information about this entry. For example, tapping or clicking on the ellipses next to the eye exam eligibility entry may display in the detailed benefits information window 726 detailed benefits information for vision office visits. The agent may read and provide this detailed information to the caller if needed.

Figure 10:
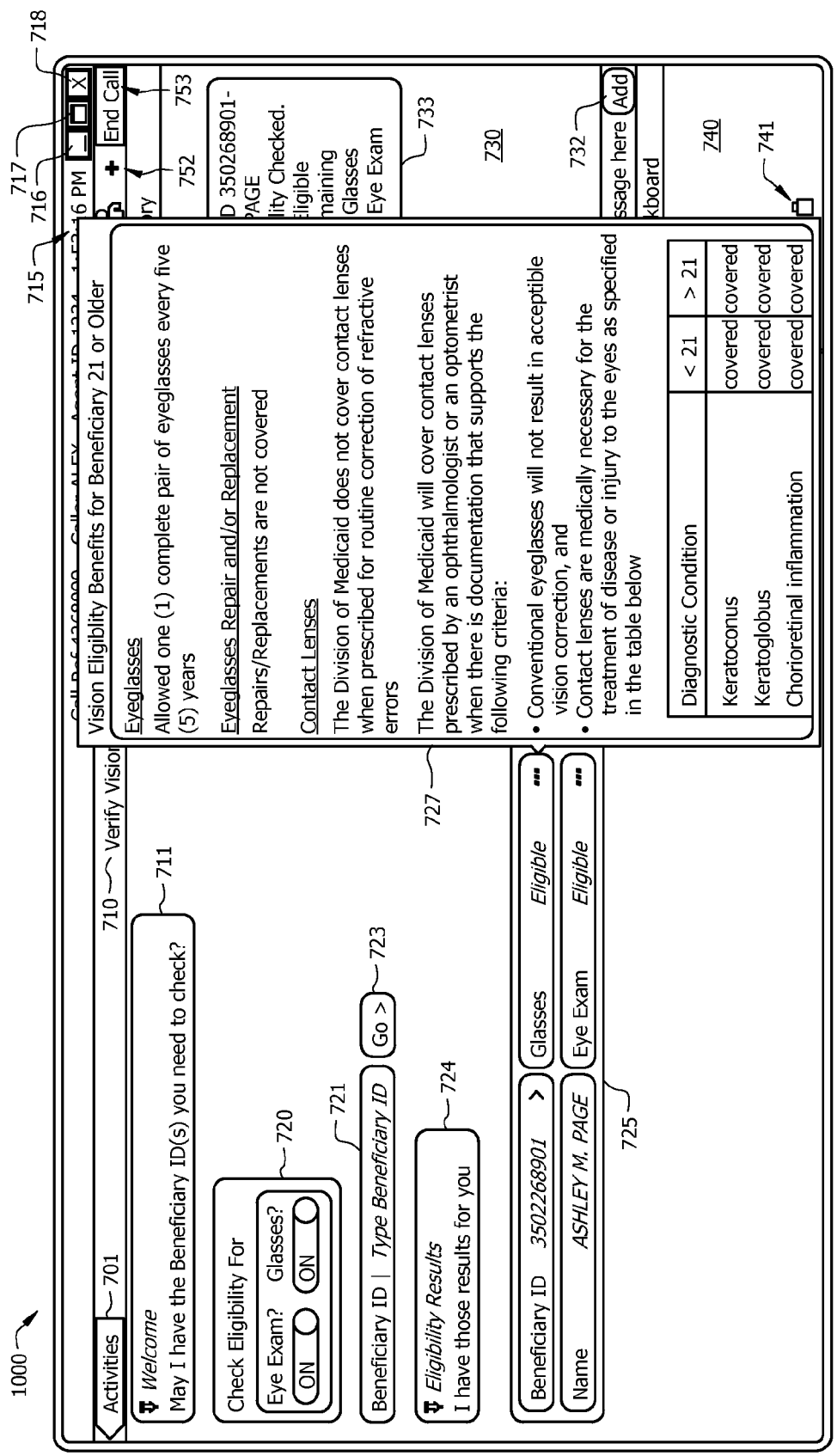
FIG. 10 is a screen shot of another embodiment of a call center system interface.

FIG. 10 illustrates another embodiment of the screen view or window 700, which may be shown on the device screen after displaying the beneficiary information list or table 725. The screen view 700 may include a second detailed benefits information window 727, which may be displayed after tapping or clicking on a designated for a second entry in the beneficiary information list or table 725. For example, tapping or clicking on the ellipses next to the glasses eligibility entry may display in the second detailed benefits information window 727 detailed benefits information for eyeglasses benefits. The agent may read and provide this detailed information to the caller if needed.

Displaying more detailed information only when needed, such as when the agent actively displays the detailed benefits information window 726 or the second detailed benefits information window 727 upon customer request, may simplify the process, reduce transaction time, and provide for a better experience for the agent. Displaying additional unnecessary information on the screen may sometimes become confusing or distracting and may cause unnecessary time waste or delay.

Figure 11:
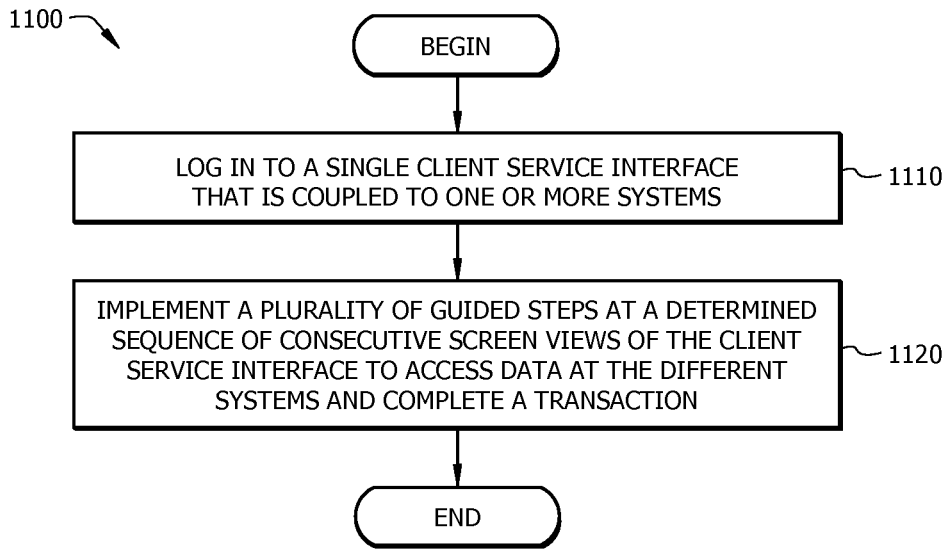
FIG. 11 is a flowchart of an embodiment of a process flow method for a client service center system.

FIG. 11 illustrates an embodiment of a process flow method 1100 for a client service center system, which may be implemented to complete a transaction in a customer or data service center, such as in call centers, mailrooms, or data entry stations. For instance, the process flow method 1100 may be implemented using the screen views or windows of a call center system interface, as described above. The method 1100 may be based on using a single interface (software or application) and navigating a series of consecutive screen views of the interface to implement a plurality of steps for completing a transaction. The transaction may be a customer call support session, such as for a healthcare or Medicare information as described above. In other embodiments, the transaction may be a data entry session, a claims processing transaction, for instance to verify whether claims (e.g., Medicare or Medicaid claims) should be denied, or a mail classification transaction to process bulk scanned mail.

Specifically, a user (e.g., a call center agent) may access one screen view at a time and may navigate forward and backward between the screen views. Additionally, at any of the screen views, data may be obtained and/or accessed at a plurality of systems/data stores coupled to (or in communications with) the single interface. The systems may be remote systems at different locations and may be accessed by the single interface. For instance, the client service system may be a CRM system for obtaining Medicare or other healthcare benefits eligibility information (as described above) and may be coupled to a plurality of Medicare MIS and/or other MISs and data stores.

The method 1110 may begin at block 1110, where a single client interface that is coupled to one or more systems may be logged into. For instance, log in ID and password information may be entered and submitted using the screen view 200 to obtain authorization to access the system interface and the systems coupled to the interface. At block 1120, a plurality of guided steps may be implemented at a determined sequence of consecutive screen views of the single client service interface to access data at the different systems and complete a transaction. The interface may reveal the steps in a hierarchical manner, e.g., where more general steps (and data) are revealed at current screen views and more detailed and dependent steps (and data) are revealed at subsequent screen views, e.g., based on one or more selected activities and feedback by the user. For instance, the screen views 300 to 700 may be operated in sequence as described above to complete a customer call transaction to inquire about benefits eligibility. The method 1100 may then end.

In the method 1100, a single login into a single interface may be need to access the different systems and complete the transaction. Further, a single screen view of the interface may be accessed and operated at a time. The method 1100 may be used to reduce the training time for operating the interface (e.g., for a CRM system) and reduce the time to complete a transaction (within a single session). The training process may use all available functions and features of the system interface, e.g., instead of a portion of the available functions and features. Reducing the training time and transaction time may reduce overall operating costs for such systems. To guide the user through the needed steps at the sequence of screen views, the screen views may be configured to enable a determined sequence of subsequent actions (e.g., reading scripts, entering data, submitting data, obtaining results based on submitted data, etc.), as described in the screen views above. For example, scripts to aid an agent to communicate with a customer may be displayed in proper time between the sequence of steps, as described above. This may simplify the process flow and completing the transaction for the user. Restricting the user to process or handle one screen view at a time, e.g., instead of opening and processing multiple screen views simultaneously, may also simplify the transaction for the user.

Figure 12:
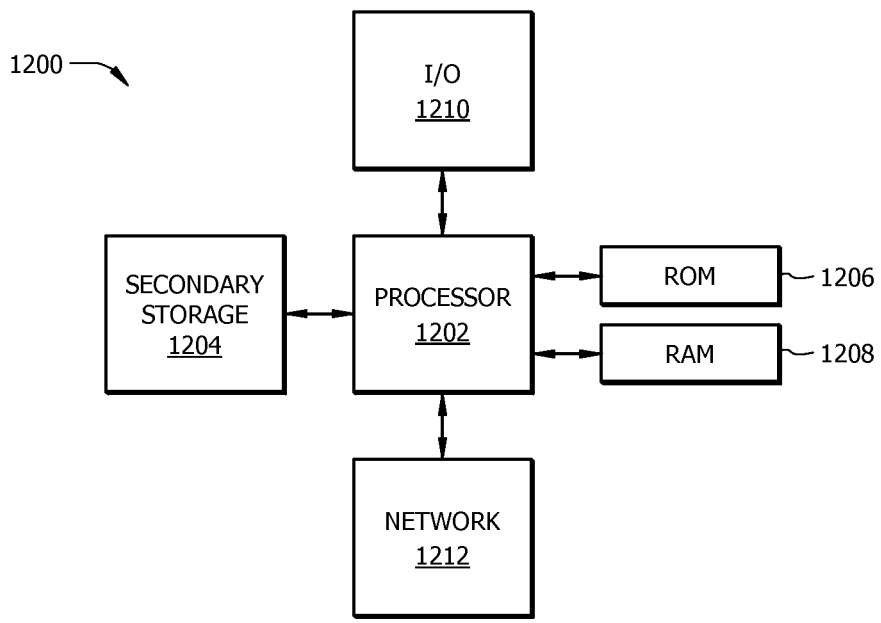
FIG. 12 is a schematic diagram of an embodiment of a general-purpose computer system.

The components described above may be implemented on any general-purpose network component, such as a computer or mobile device with sufficient processing power, memory resources, and network throughput capability to handle the necessary workload placed upon it. FIG. 12 illustrates a typical, general-purpose network component 1200 suitable for implementing one or more embodiments of the components disclosed herein. The network component 1200 includes a processor 1202, e.g., a central processing unit (CPU), which is in communication with memory devices including secondary storage 1204, read only memory (ROM) 1206, random access memory (RAM) 1208, input/output (I/O) devices 1210, and network connectivity devices 1212. The processor 1202 may be implemented as one or more central processing unit (CPU) chips, or may be part of one or more application specific integrated circuits (ASICs) and/or digital signal processors (DSPs).

The secondary storage 1204 is typically comprised of one or more disk drives or tape drives and is used for non-volatile storage of data and as an over-flow data storage device if RAM 1208 is not large enough to hold all working data. Secondary storage 1204 may be used to store programs that are loaded into RAM 1208 when such programs are selected for execution. The ROM 1206 is used to store instructions and perhaps data that are read during program execution. ROM 1206 is a non-volatile memory device that typically has a small memory capacity relative to the larger memory capacity of secondary storage 1204. The RAM 1208 is used to store volatile data and perhaps to store instructions. Access to both ROM 1206 and RAM 1208 is typically faster than to secondary storage 1204.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 7, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 7 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for handling a transaction for a client service center comprising:
    a computer processor;
    a memory coupled to the computer processor that stores computer-executable instructions; and
    only one interface coupled to the computer processor and configured to communicate with a plurality of data stores to access data, interact with a user via a single screen device, and display one at a time on the single screen device a plurality of subsequent and dependent screen views to enable the user to view the data and implement a sequence of steps selected by the user to complete a transaction, the interface not displaying and not notifying the user of access to the data on the different data stores, the interface receiving an indication of a caller type selected from a list of a plurality of different caller types, the screen views being displayed in a determined order based on the caller type, the transaction, and the steps selected by the user to reveal the data and the steps in a hierarchical manner from more general data and steps to more detailed and dependent data and steps, each of the screen views comprising a story window and a chalkboard window, the story window in each of the screen views comprising an add button that enables the user to enter messages to the story window, the story window in each of the screen views being configured to automatically display steps implemented by the user, the chalkboard window in each of the screen views being configured to automatically display identification (ID) information submitted by the user, at least one of the screen views comprising a beneficiary information table, the beneficiary information table comprising a plurality of entries, a first portion of the entries comprising graphical indicators that when selected by the user display additional information about the first portion of the entries, a second portion of the entries not comprising the graphical indicators, another one of the screen views comprising an activity selection screen that displays a plurality of available activities and allows the user to select multiple activities, the plurality of available activities being displayed based on the caller type such that each of the plurality of different caller types has a different set of available activities displayed, one set of the available activities comprising a verify vision eligibility icon that enables the user to lookup eligibility for an eye exam and glasses, a second set of the available activities comprising a verify dental eligibility icon that enables the user to lookup eligibility for a specific set of dental codes, a third set of the available activities comprising a new or replacement card icon that enables the user to order medical cards for beneficiaries, a fourth set of the available activities comprising a claim inquiry that enables the user to lookup a status of a claim, a fifth set of the available activities comprising an eligibility icon that enables the user to lookup an eligibility status, a sixth set of available activities comprising a general information icon that enables the user to lookup general information, a seventh set of available activities comprising an identification card icon that enables the user to request identification cards, the activity selection screen comprising a new activity icon, selection of the new activity icon opening a second activity selection screen and minimizing the current activity selection screen, the second activity selection screen displaying the plurality of available activities and allowing the user to process multiple activities during a single call session in parallel, and information entered into each of the screen views being associated with the screen view in which the information is entered and is stored to a file in persistent storage for logging purposes.

2. The system of claim 1, wherein the plurality of different caller types comprises a beneficiary, a provider, an unenrolled beneficiary, an unenrolled provider, no response from caller, and wrong number, and the interface comprising a software application implemented on a computer device.

3. The system of claim 1, wherein the screen device is a touch screen device configured to receive input from the user via touch functions and display the data via the screen views, the plurality of entries in the beneficiary information table comprising beneficiary identifier, name, glasses, eye exam, and office visits, and the graphical indicators comprised by the first portion of the entries comprising ellipses.

4. The system of claim 1, wherein the interface is the only interface that interacts with the user and accesses the data to complete the transaction.

5. The system of claim 1, wherein the transaction is a customer support call session for servicing a customer inquiry.

6. The system of claim 5, wherein the interface is configured to display a plurality of scripts on the screen views to guide the user on how to communicate with a customer during the customer support call session.

7. The system of claim 5, wherein the customer inquiry is related to healthcare benefits information.

8. The system of claim 1, wherein the transaction is a healthcare claims processing transaction to determine whether a healthcare benefit claim should be denied.

9. The system of claim 1, wherein the transaction is a mail classification transaction for bulk scanned mail at a mail center.

10. The system of claim 1, wherein the interface is a data entry interface.

11. The system of claim 1, wherein the screen views are only navigated sequentially by the user in the determined order to guide the user to complete the transaction, and the user being allowed to move to previous screen views in a reverse determined order.

12. An apparatus for client service center processing comprising:
a computer processor; and
a memory coupled to the computer processor that stores computer-executable instructions, the computer-executable instructions causing the computer processor to be configured to:
enable a user to log into a client service interface for a customer relationship management (CRM) system that is coupled to a plurality of databases, management information systems (MISs), or both;
display a pre-determined sequence of screen views of the client service interface consecutively one at a time as prompted by the user to allow the user to access data at the databases, MISs, or both;
implement a plurality of steps selected by the user via the consecutively displayed screen views that guide the user to complete a transaction; and
receive an indication of a caller type selected from a list of a plurality of different caller types, the screen views being displayed in the pre-determined order based at least in part on the caller type, the screen views providing a script that the user should read to a caller, each of the screen views comprising a story window and a chalkboard window, the story window in each of the screen views comprising an add button that enables the user to enter messages to the story window, the story window in each of the screen views being configured to automatically display steps implemented by the user, the chalkboard window in each of the screen views being configured to automatically display identification (ID) information submitted by the user, at least one of the screen views comprising a beneficiary information table, the beneficiary information table comprising a plurality of entries, a first portion of the entries comprising graphical indicators that when selected by the user display additional information about the first portion of the entries, a second portion of the entries not comprising the graphical indicators, another one of the screen views comprising an activity selection screen that displays a plurality of available activities and allows the user to select multiple activities, the plurality of available activities that are displayed being based on the caller type such that each of the plurality of different caller types has a different set of available activities displayed, one set of the available activities comprising a verify vision eligibility icon that enables the user to lookup eligibility for an eye exam and glasses, a second set of the available activities comprising a verify dental eligibility icon that enables the user to lookup eligibility for a specific set of dental codes, a third set of the available activities comprising a new or replacement card icon that enables the user to order medical cards for beneficiaries, a fourth set of the available activities comprising a claim inquiry that enables the user to lookup a status of a claim, a fifth set of the available activities comprising an eligibility icon that enables the user to lookup an eligibility status, a sixth set of available activities comprising a general information icon that enables the user to lookup general information, a seventh set of available activities comprising an identification card icon that enables the user to request identification cards, the activity selection screen comprising a new activity icon, selection of the new activity icon opening a second activity selection screen and minimizing the current activity selection screen, the second activity selection screen displaying the plurality of available activities and allowing the user to process the multiple activities during a single call session in parallel, and information entered into each of the screen views being associated with the screen view in which the information is entered and is stored to a file in persistent storage for logging purposes.

13. The apparatus of claim 12, wherein the plurality of different caller types comprises a beneficiary, a provider, an unenrolled beneficiary, an unenrolled provider, no response from caller, and wrong number, and the user logging into the client service interface only once to access the data on the databases, MISs, or both and completes the transaction without using any other interface.

14. The apparatus of claim 12, wherein the sequence of consecutively displayed screen views in the determined sequence reduces training time for the user to a plurality of minutes or hours in comparison to using a plurality of displayed screen views in a random order or at about the same time, the plurality of entries in the beneficiary information table comprising beneficiary identifier, name, glasses, eye exam, and office visits, and the graphical indicators comprised by the first portion of the entries comprising ellipses.

15. The apparatus of claim 12, wherein the sequence of consecutively displayed screen views reduce transaction time for the user by about at least 75 percent of time in comparison to using a plurality of displayed screen views in a random order or at about the same time.

16. The apparatus of claim 12, wherein the screen views are displayed in the pre-determined order based on the caller type, on the transaction, and the steps selected by the user to reveal the data and the steps in a hierarchical manner from more general data and steps to more detailed and dependent data and steps.

17. The apparatus of claim 12, wherein the CRM system communicates with the databases and the MISs without notifying the user of access to data on the databases and the MISs.

18. A computer-based system for customer relationship management (CRM) comprising:
a computer processor; and
a memory coupled to the computer processor that stores computer-executable instructions that cause the computer processor to:
display a log-in screen view on a screen device to authorize access to a CRM system and one or more data stores and management information systems (MISs) coupled to the CRM system;
display a start session screen view that replaces the log-in screen view on the screen device to initiate a call session transaction for a caller after authorizing access to the CRM system;
display a caller type identification screen view that replaces the start session screen view on the screen device to identify the caller's type after starting the call session;
display a party verification screen view that replaces the caller type identification screen view on the screen device to verify a party associated with the caller after identifying the caller's type;

display an activity selection screen view that replaces the party verification screen view on the screen device to select one of a plurality of activities available for the party after verifying the party, the activity selection screen view displaying the plurality of available activities and allowing a user to select multiple activities, the plurality of available activities being displayed based on a caller type such that each of a plurality of different caller types has a different set of available activities displayed, one set of the available activities comprising a verify vision eligibility icon that enables the user to lookup eligibility for an eye exam and glasses, a second set of the available activities comprising a verify dental eligibility icon that enables the user to lookup eligibility for a specific set of dental codes, a third set of the available activities comprising a new or replacement card icon that enables the user to order medical cards for beneficiaries, a fourth set of the available activities comprising a claim inquiry that enables the user to lookup a status of a claim, a fifth set of the available activities comprising an eligibility icon that enables the user to lookup an eligibility status, a sixth set of available activities comprising a general information icon that enables the user to lookup general information, a seventh set of available activities comprising an identification card icon that enables the user to request identification cards;

display an activity screen view that replaces the activity selection screen view on the screen device to implement a selected activity after selecting one or more of the multiple activities;

receive an indication of the caller's type selected from a list of the plurality of different caller types, screen views being displayed in a pre-determined order based at least in part on the caller's type; and display a beneficiary information table, the beneficiary information table comprising a plurality of entries, a first portion of the entries comprising graphical indicators that when selected by the user display additional information about the first portion of the entries, a second portion of the entries not comprising the graphical indicators, each of the screen views comprising a story window and a chalkboard window, the story window in each of the screen views comprising an add button that enables the user to enter messages to the story window, the story window in each of the screen views being configured to automatically display steps implemented by the user, the chalkboard window in each of the screen views being configured to automatically display identification information submitted by the user, the activity selection screen comprising a new activity icon, selection of the new activity icon opening a second activity selection screen and minimizing the current activity selection screen, the second activity selection screen displaying the plurality of available activities and allowing the user to process multiple activities during a single call session in parallel, and information entered into each of the screen views being associated with the screen view in which the information is entered and is stored to a file in persistent storage for logging purposes.

19. The computer-based system of claim 18, wherein the plurality of different caller types comprises a beneficiary, a provider, an unenrolled beneficiary, an unenrolled provider, no response from caller, and wrong number, and the log-in screen view, the start session screen view, the caller type identification screen view, the party verification screen view, the activity selection screen view, and the activity screen view are displayed in sequence to reveal a plurality of steps and data in a hierarchical manner from more general steps and data to more detailed and dependent steps and data.

20. The computer-based system of claim 18, wherein the computer processor accesses data on remote systems to display the data on the log-in screen view, the start session screen view, the caller type identification screen view, the party verification screen view, the activity selection screen view, and the activity screen view without notifying the user of access to data on the remote systems, the plurality of entries in the beneficiary information table comprising beneficiary identifier, name, glasses, eye exam, and office visits, and the graphical indicators comprised by the first portion of the entries comprising ellipses.

21. The computer-based system of claim 18, wherein the log-in screen view, the start session screen view, the caller type identification screen view, the party verification screen view, the activity selection screen view, and the activity screen view are displayed using only one software interface that runs on the computer processor.

22. The computer-based system of claim 18, wherein the log-in screen view comprises a log-in identifier (ID) input field for entering a log-in user ID, a password input field for entering a user password, a sign-in button for submitting the entered log-in user ID and password, and a cancel button for canceling authorization for access, and the log-in screen view providing access authorization to access the CRM system and data from the one or more data stores and MISs.

23. The computer-based system of claim 18, wherein the start session screen view comprises a start call button for starting a call session with the caller, a call reference indicator, a caller indicator, an agent identification (ID) indicator that displays an agent ID that identifies a current user, a time indicator that displays current time, a maximize window button for expanding the start session screen, a minimize window button for collapsing the start session screen view, and a close window button for closing the start session screen view and ending access to the CRM system.

24. The computer-based system of claim 18, wherein the caller type identification screen view comprises a script window that displays a suggested script for inquiring about the type of caller, a caller type menu comprising a list of types of callers available for selection, a continue button for submitting a selected type of caller that is displayed after selecting the type of caller, a message input field for entering a message by the user, the add button for submitting the entered message, a trash bin icon for removing displayed information in the chalkboard window, a call reference indicator that displays a call identification (ID) that uniquely identifies the call session, a caller indicator, an agent ID indicator that displays an agent ID that identifies the user, a time indicator that displays current time, a maximize window button for expanding the caller type identification screen view, a minimize window button for collapsing the caller type identification screen view, a close window button for closing the caller type identification screen view and ending access to the CRM system, and a call options icon for showing a list of available call options.

25. The computer-based system of claim 18, wherein the selected type of caller is a provider, and the party verification screen view being a provider verification screen view that comprises a navigate-back button for returning to the caller type identification screen view, a script window that displays a suggested script for verifying the caller's identity by requesting a provider identification (ID), a caller ID input field for entering the provider ID, a go button for submitting the provider ID, a call information list that displays information about the provider associated with the provider ID that is displayed after submitting the provider ID, a second script window that displays a suggested script for requesting a caller name that is displayed after submitting the provider ID, a caller input field for entering the caller name that is displayed after submitting the provider ID, a caller menu comprising a list of names of callers available for selection that is displayed after submitting the provider ID, a verified button for submitting an entered or selected caller name that is displayed after entering or selecting the caller name.

26. The computer-based system of claim 25, wherein the provider verification screen view further comprises a message input field for entering a message by the user, the add button for submitting the entered message, a trash bin icon for removing displayed information in the chalkboard window, a call reference indicator that displays a call ID that uniquely identifies the call session, a caller indicator, an agent ID indicator that displays an agent ID that identifies the user, a time indicator that displays current time, a maximize window button for expanding the party verification screen view, a minimize window button for collapsing the party verification screen view, a close window button for closing the party verification screen view and ending access to the CRM system, and a call options icon for showing a list of available call options.

27. The computer-based system of claim 18, wherein the activity selection screen view comprises a navigate-back button for returning to the party verification screen view, a script window that displays a suggested script for asking the caller which activity the caller is requesting, a search input field for entering an activity the caller is requesting, a plurality of activity icons that represent a plurality of corresponding activities that are available, a story window for displaying automatically one or more steps performed by the user, a message input field for entering a message by the user, the add button for submitting the entered message, the chalkboard window for displaying automatically submitted identification (ID) information, a trash bin icon for removing displayed information in the chalkboard window, a call reference indicator that displays a call ID that uniquely identifies the call session, a caller indicator that displays the caller's name, an agent ID indicator that displays an agent ID that identifies the user, a time indicator that displays current time, a maximize window button for expanding the activity selection screen view, a minimize window button for collapsing the activity selection screen view, a close window button for closing the activity selection screen view and ending access to the CRM system, a call options icon for showing a list of available call options, and a caller information icon for showing available information about the caller.

* * * * *